June 21, 1927.
C. J. CUPPETT
1,633,001
VEHICLE BRAKE
Filed May 14, 1926
2 Sheets-Sheet 1
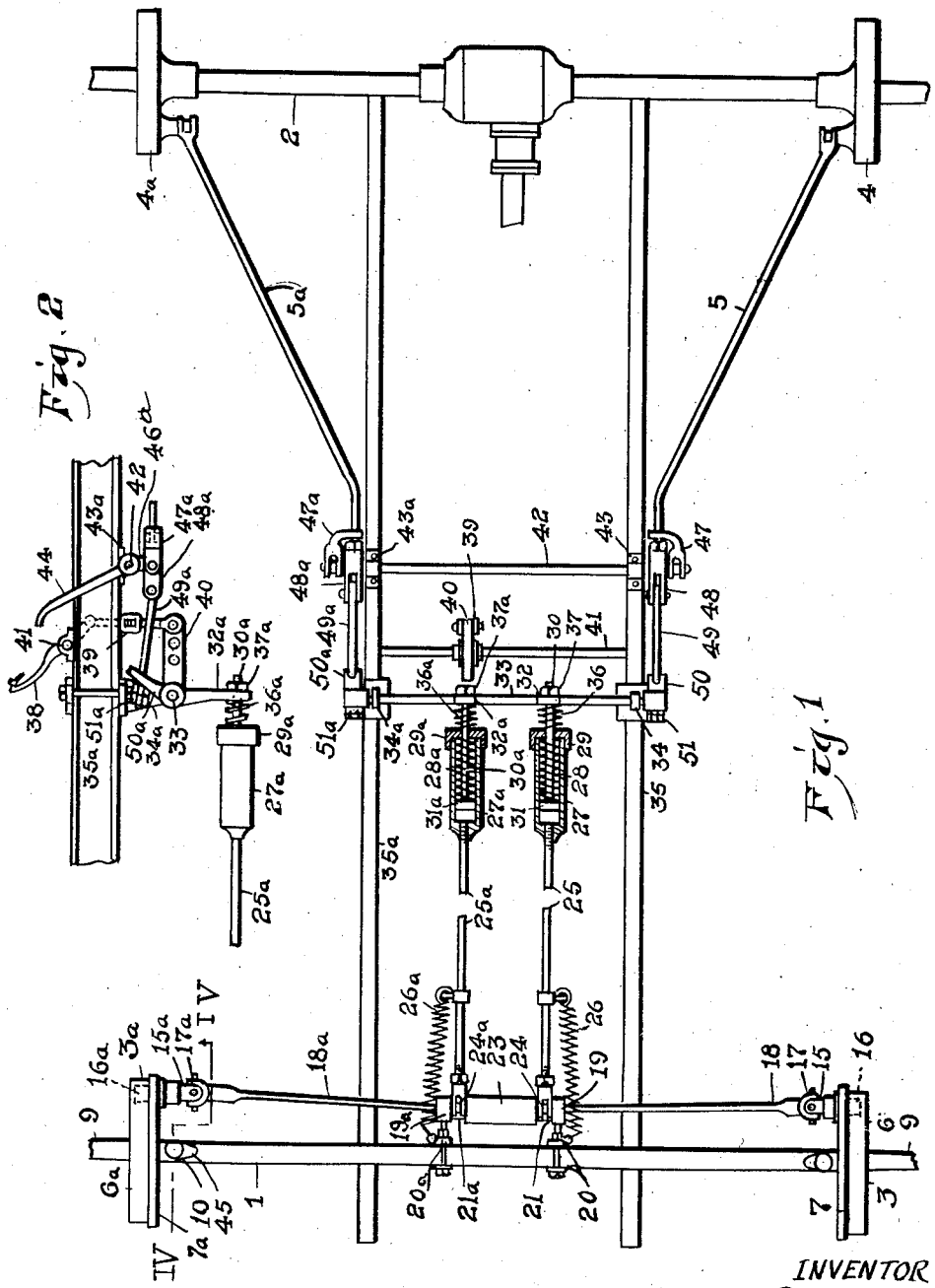
INVENTOR
C. J. Cuppett
by F. N. Barber
attorney June 21, 1927.
C. J. CUPPETT
1,633,001
VEHICLE BRAKE
Filed May 14, 1926
2 Sheets-Sheet 2
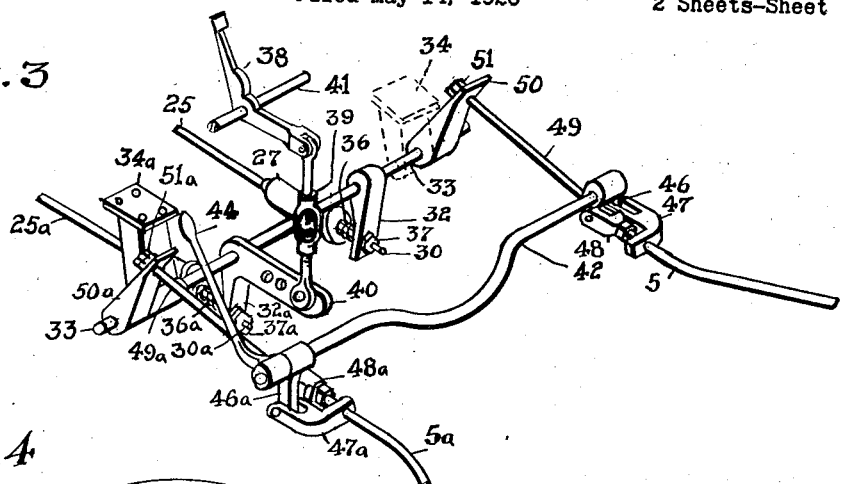
Fig. 3
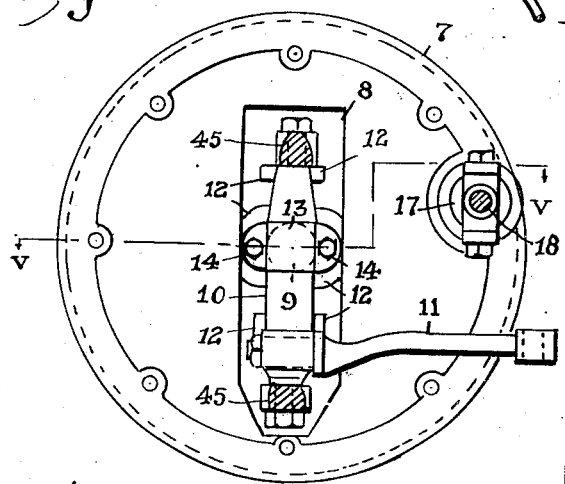
Fig. 4
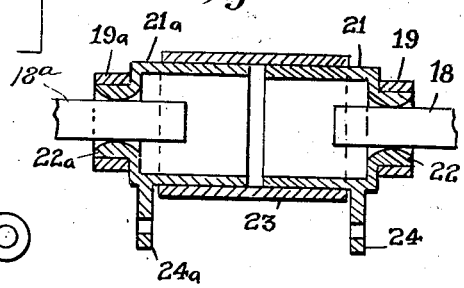
Fig. 6
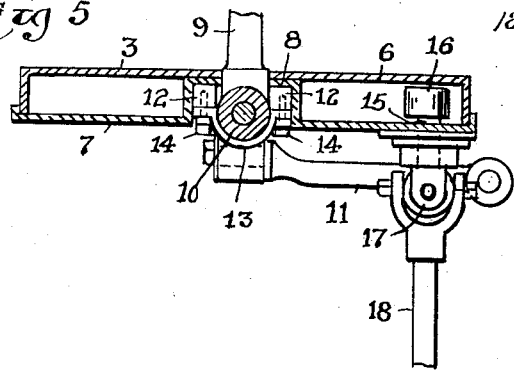
Fig. 5
Fig. 7
INVENTOR.
C. J. Cuppett
BY
F. N. Barber
ATTORNEY.

Patented June 21, 1927.

1,633,001

UNITED STATES PATENT OFFICE.

CHARLES J. CUPPETT, OF UNIONTOWN, PENNSYLVANIA.

VEHICLE BRAKE.

Application filed May 14, 1926. Serial No. 109,013.

My invention relates to automobile brakes.

It is one object of this invention to provide a simple and comparatively inexpensive attachment for applying fore-wheel brakes to an automobile already equipped with rear-wheel brakes. Another object is to provide for making the brake pedal apply brakes to all four wheels of an automobile, and the hand or emergency brake lever apply the rear brakes only. My invention contemplates its incorporation into automobiles not as an attachment, but as a unitary part of the original automobile structure suitably modified or adapted for its accommodation. My invention also contemplates means for equalizing the braking of the front wheels. Other objects appear hereinafter.

Referring to the accompanying drawings, Fig. 1 is a bottom plan view of an automobile chassis with my invention applied thereto, parts being omitted and broken away; Fig. 2, a side view of the central portion of the chassis with adjacent portions of my invention; Fig. 3, a perspective view of the central portion of my invention without the chassis; Fig. 4, a section on the line IV—IV on Fig. 1; Fig. 5, a section on the line V—V on Fig. 4; Fig. 6, a plan view of one of the rotary brake rods for the front wheels and portions adjacent thereto, parts being broken away; and Fig. 7, a central vertical section through brake-rod turning means together with portions of the brake-rods projecting into the same.

Referring to the drawings, 1 designates the front axle of an automobile and 2 the rear axle thereof. 3 and 3$^a$ are the front brakes and 4 and 4$^a$ are the rear brakes, the wheels being omitted and the brake structures not being shown, as they are well known and may be in accordance with various known types. The brakes 4 and 4$^a$ are of the usual type and are operated by the usual brake rods 5 and 5$^a$ extending forwardly to suitable operating means to be described.

The brake drum for the front brake 3 comprises an outer cup-shaped member 6 and an inner cover member 7 telescoped over the member 6. The member 7 has the depression 8 bulging toward the base or bottom wall of the member. The central parts of the base wall and of the depression have holes to receive the wheel axle 9. The depression 8 is made oblong and receives the steering spindle or knuckle 10, which is pivoted between the fork members 45 of the axle and provided with the usual steering arm 11. The spindle 10 is seated between and against lugs 12 secured to the cover in the depression. A clip 13 lies on the inner face of the central part of the spindle and has its ends secured by bolts 14 to the central pair of lugs 12.

15 is a horizontal rotary stub-shaft extending through the cover member 7 into the interior of the drum of the brake 3 where it is provided with the cam 16 or other device for setting the brake. The inner end of the shaft 15 is connected by the universal joint 17 to the rotary rod 18 extending toward the center of the vehicle at the rear of the axle 1. The drum of the brake 3$^a$ is constructed the same as the drum of the brake 3 and the parts marked 15$^a$, 16$^a$, 17$^a$ and 18$^a$ are like the parts marked 15, 16, 17 and 18 respectively. The numerals with the letter "a" designate parts like those marked with the same numeral without the letter "a," but are associated with brakes on the left-hand side of the automobile, while the numerals without the letter "a" refer to brakes for the right-hand side of the automobile, except in those instances where a numeral without the letter "a" designates parts not restricted to certain of the brakes or where a numeral without the letter "a" has no companion numeral with the letter "a."

Two bearings 19 and 19$^a$ lie at the rear of the axle 1 and are connected thereto by means of the clamp members 20 and 20$^a$ bolted to the front and rear sides of the axle 1. Two oscillatory cylinders 21 and 21$^a$ lying parallel with the axle 1 have their inner ends opposed and their outer ends reduced and forming journals 22 and 22$^a$ fitting in the bearings 19 and 19$^a$. The cylinders 21 and 21$^a$ between the bearings 19 and 19$^a$ are surrounded by a cylinder 23 which forms a bearing and support for the cylinders 21 and 21$^a$ and keeps them in axial alinement. The inner ends of the rods 18 and 18$^a$ are non-circular in cross-section and extend into the outer ends of the cylinders 21 and 21$^a$, respectively, through non-circular holes conforming substantially to the cross-sectional shape of the said ends.

The cylinders 21 and 21$^a$ have near their outer ends pendent arms 24 and 24$^a$, respectively. These arms are connected to separate rods or link members 25 and 25$^a$ which are provided with the springs 26 and 26ᵃ tending to move the link members forwardly. The rear ends of the members 25 and 25ᵃ are screwed into the front ends of the cylinders 27 and 27ᵃ which contain helical springs 28 and 28ᵃ having their rear ends seated against the inner faces of the cylinder caps 29 and 29ᵃ. Rods or link members 30 and 30ᵃ project through the said caps and springs and have at their front ends heads 31 and 31ᵃ seated against the front ends of the said springs. The rear ends of the rods 30 and 30ᵃ project through the arms 32 and 32ᵃ pendent from the rock shaft 33 carried in bearings in the brackets 34 and 34ᵃ bolted to the side members 35 and 35ᵃ of the chassis frame. Helical spring 36 and 36ᵃ surround the rods 30 and 30ᵃ between the caps 29 and 29ᵃ and the arms 32 and 32ᵃ to keep the nuts 37 and 37ᵃ, which are screwed on the rods, closely against the rear faces of the arms, whereby noise is eliminated and the nuts are kept from unscrewing. The shaft 33 is actuated by the pedal 38, connected by the adjustable link 39 to the arm 40 connected to the shaft at its rear side. The pedal is mounted on the shaft 41.

42 is a rock shaft turning on bearings 43 and 43ᵃ on the frame members 35 and 35ᵃ, and operable by the hand or emergency brake lever 44. The shaft 42 has the pendent arms 46 and 46ᵃ, whose lower ends are pivoted to the rearwardly-extending L-shaped members 47 and 47ᵃ having holes to receive the rods 5 and 5ᵃ. The rear parts, that is, the inwardly-turned ends, of the members 47 and 47ᵃ are disposed so as to engage the lock nuts at the rear ends of the forks 48 and 48ᵃ attached to the front ends of the rods 5 and 5ᵃ. Rods or links 49 and 49ᵃ are pivoted to the said forks and pass loosely through the upstanding arms 50 and 50ᵃ on the shaft 33. These rods have nuts 51 and 51ᵃ on their front ends, the nuts being arranged to engage the front faces of the arms 50 and 50ᵃ.

When the automobile is going straight ahead with brakes off, the parts will be as shown in the drawings. If the pedal 38 is pressed forwardly, it will lift the link 39, which acting on the arm 40 will turn the shaft 33 anticlockwise. The arms 32 and 32ᵃ will move rearwardly, causing the rods 30 and 30ᵃ, acting through the springs 28 and 28ᵃ, to move the rods 25 and 25ᵃ rearwardly. The latter rods acting on the arms 24 and 24ᵃ turn the cylinders 21 and 21ᵃ axially, which turn the brake rods 18 and 18ᵃ, the universal joints 17 and 17ᵃ, the stub-shafts 15 and 15ᵃ, and the cams 16 and 16ᵃ, the latter operating the brakes in the brake drums. The springs 28 and 28ᵃ cause the brakes to be applied gradually and easily. The nuts 37 and 37ᵃ permit independent adjustment of the pressures delivered to the brakes. When the pedal is released the springs 26 and 26ᵃ return the parts to their idle positions.

At the same time the front brakes are applied, the arms 50 and 50ᵃ acting through the links 49 and 49ᵃ and the forks 48 and 48ᵃ, pull the brake-rods 5 and 5ᵃ forwardly, whereby the rear brakes are set.

If the hand lever 44 is pulled rearwardly, it will rock the shaft 42 clockwise, causing the arms 46 and 46ᵃ to draw the L-shaped members 47 and 47ᵃ forwardly, which pull the brake rods 5 and 5ᵃ forwardly and set the rear brakes. The front brakes remain idle because the links 49 and 49ᵃ slide idly forward in the arms 50 and 50ᵃ.

When the brakes are applied while the automobile is turning the operation is the same as already described. The universal joints 17 and 17ᵃ are flexed, and one of the rods 18 and 18ᵃ is moved farther into its cylinder 21 or 21ᵃ, and the other rod is moved outwardly in its cylinder.

I claim—

For an automobile, a rock-shaft, an upwardly and a downwardly, projecting arm carried thereby, a front wheel brake, a rear wheel brake, a rod connected to the front wheel brake and the downwardly extending arm so as to operate the latter brake when the rock shaft is rocked forwardly, a rod connected to the rear wheel brake and the upwardly extending arm so as to operate the latter brake when the rock shaft is rocked in the said direction, a second rock shaft, an L-shaped member connected to the latter shaft to operate the rear wheel brake when the latter shaft is rocked rearwardly, the rod sliding idly in the said member when the first rock-shaft is so rocked and idly in the upwardly extending arm when the second rock-shaft is so rocked, and separate means for rocking the rock-shafts, the second rock-shaft having an arm pivoted to one end of the said member while the other end of the same loosely embraces the rear brake rod.

In testimony whereof I affix my signature.

CHARLES J. CUPPETT.